US009672305B1

United States Patent
Vats et al.

(10) Patent No.: US 9,672,305 B1
(45) Date of Patent: Jun. 6, 2017

(54) METHOD FOR GATING CLOCK SIGNALS USING LATE ARRIVING ENABLE SIGNALS

(71) Applicant: Apple Inc., Cupertino, CA (US)

(72) Inventors: Suparn Vats, Fremont, CA (US);
Daniel J. Flees, Palo Alto, CA (US);
Rohit Kumar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 14/607,278

(22) Filed: Jan. 28, 2015

(51) Int. Cl.
*G06F 17/50* (2006.01)
*H03L 7/00* (2006.01)
*G06F 1/32* (2006.01)

(52) U.S. Cl.
CPC .......... *G06F 17/505* (2013.01); *G06F 1/3237* (2013.01); *G06F 17/50* (2013.01); *G06F 17/5022* (2013.01); *G06F 17/5036* (2013.01); *G06F 17/5045* (2013.01); *G06F 17/5059* (2013.01); *G06F 2217/62* (2013.01); *G06F 2217/78* (2013.01); *H03L 7/00* (2013.01)

(58) Field of Classification Search
CPC .. G06F 17/505; G06F 17/5022; G06F 1/3237; G06F 17/50; G06F 17/5045; G06F 2217/62; G06F 17/5036; G06F 17/5059; G06F 2217/78; G06F 2217/84; H03L 7/00; Y02B 60/1221
See application file for complete search history.

(56) References Cited

U.S. PATENT DOCUMENTS

| | | | | |
|---|---|---|---|---|
| 6,327,684 B1 * | 12/2001 | Nadeau-Dostie | .. | G01R 31/3016 714/731 |
| 6,434,704 B1 * | 8/2002 | Dean | ........................ | G06F 1/10 713/320 |
| 6,536,024 B1 * | 3/2003 | Hathaway | ........... | G06F 17/5045 327/295 |
| 7,117,143 B2 * | 10/2006 | Wang | .................. | G06F 17/5027 703/13 |
| 7,483,823 B2 * | 1/2009 | Alfieri | ................. | G06F 17/5045 703/14 |
| 7,567,893 B2 * | 7/2009 | Torossian | ............ | G06F 17/5022 703/16 |
| 7,747,971 B1 * | 6/2010 | Chopra | ................. | G06F 17/504 716/136 |
| 7,750,680 B2 * | 7/2010 | Mamidipaka | ...... | H03K 19/0016 326/93 |

(Continued)

*Primary Examiner* — Helen Rossoshek
(74) *Attorney, Agent, or Firm* — Meyertons, Hood, Kivlin, Kowert & Goetzel, P.C.

(57) ABSTRACT

A method for designing clock gates which may reduce timing requirements associated with clock gating control signals may include identifying a clock gating function included in a Hardware Description Language of an integrated circuit, wherein the clock gating function may include capturing a state of an enable signal dependent upon a clock signal. The method may include determining a delay time for capturing the state of the enable signal dependent on a time difference between transitions of the enable signal and the clock signal. The method may include creating a gating circuit, in which the gating circuit includes a delay unit coupled to a source of the clock signal, and wherein a delay value is dependent upon the amount of time to delay capturing the enable signal. The method may include modifying the HDL model dependent upon the clock gating circuit.

20 Claims, 7 Drawing Sheets

(56) References Cited

U.S. PATENT DOCUMENTS

| | | | | |
|---|---|---|---|---|
| 7,805,697 | B2* | 9/2010 | Wood | G06F 17/5036 716/113 |
| 7,913,222 | B2* | 3/2011 | Ogilvie | G06F 17/5045 703/13 |
| 7,996,807 | B2 | 8/2011 | Grise et al. | |
| 8,086,832 | B2* | 12/2011 | Lichtensteiger | G06F 9/3869 710/260 |
| 8,104,012 | B1* | 1/2012 | Klein | G06F 17/505 716/105 |
| 8,132,144 | B2* | 3/2012 | Sundaresan | G06F 1/3203 716/100 |
| 8,169,236 | B2* | 5/2012 | Murray | G01R 23/15 324/76.41 |
| 8,219,946 | B1* | 7/2012 | Manovit | G06F 17/505 716/104 |
| 8,291,364 | B2 | 10/2012 | Panigrahi et al. | |
| 8,347,123 | B2* | 1/2013 | Schultz | H03K 3/012 326/46 |
| 8,378,713 | B2* | 2/2013 | Suzuki | H03K 5/1252 326/52 |
| 8,533,648 | B2* | 9/2013 | Sundaresan | G06F 1/3203 716/113 |
| 8,572,534 | B2 | 10/2013 | Czeck et al. | |
| 8,572,539 | B2* | 10/2013 | Cortadella | H03K 19/20 327/142 |
| 8,756,557 | B2 | 6/2014 | Ng et al. | |
| 9,129,708 | B2* | 9/2015 | Campbell | G11C 5/143 |
| 2006/0149526 | A1* | 7/2006 | Torossian | G06F 17/5022 703/16 |
| 2008/0270099 | A1* | 10/2008 | Yen | G06F 17/5022 703/14 |
| 2008/0301604 | A1* | 12/2008 | Itskovich | G06F 17/5022 716/113 |
| 2011/0283125 | A1* | 11/2011 | Sundaresan | G06F 1/3203 713/323 |
| 2013/0002343 | A1* | 1/2013 | Wong | H02M 3/07 327/536 |
| 2014/0125381 | A1* | 5/2014 | Schreiber | G06F 17/5045 326/93 |
| 2015/0036783 | A1* | 2/2015 | Chen | G01R 31/31855 377/19 |
| 2015/0220672 | A1* | 8/2015 | Park | G06F 1/3237 703/2 |
| 2016/0065190 | A1* | 3/2016 | Paul | H03K 5/24 327/203 |

* cited by examiner

METHOD FOR GATING CLOCK SIGNALS USING LATE ARRIVING ENABLE SIGNALS

BACKGROUND

Technical Field

Embodiments described herein are related to the field of integrated circuit implementation, and more particularly to the implementation of clock gating circuits.

Description of the Related Art

Some system-on-a-chip (SoC) designs may utilize high frequency clock signals to maximize the performance capabilities of the SoC. Such high frequency clock signals may, however, contribute to high power consumption. In an attempt to manage power consumption resulting from the use of high frequency clocks, a clock signal coupled to unused or inactive portions of an SoC may be stopped for periods of time. The process of deactivating clock signals for portions of an SoC is commonly referred to as "clock gating."

The generation of control signals used to activate and deactivate clock signals during clock gating may involve complex logic functions depending on a logical state of the SoC, an operational mode of the SoC, and the like. Transitions of these control signals may require strict adherence to timing requirements to ensure the control signal is asserted and de-asserted before a corresponding transition of the clock signal. Failure to adhere to such timing requirements may result in a clock glitch, i.e., a clock pulse shorter than normal pulses or generate a clock pulse or glitch where none should be present. Such clock glitches may cause unpredictable behavior in a system as some logic gates may interpret the glitch as a normal clock pulse while other logic gates may not, potentially leading to a corruption of state within the system, eventually resulting in a functional failure.

The strict timing requirements of the control signals may restrict the number of logic gates used in the generation of the control signals, thereby limiting the logical complexity of the function used in the generation of the control signals. While employing functions of limited logical complexity may allow for achieving timing requirements for the SoC, the limitation on the number of logic gates may prevent the implementation of control signals for efficient clock gating, thereby providing fewer opportunities for clock gating and power savings.

SUMMARY OF THE EMBODIMENTS

Various embodiments of a clock gating circuits are disclosed. Broadly speaking, a system, a method, and a non-transitory computer-accessible storage medium are contemplated in which the method includes identifying a clock gating function included in a hardware description language (HDL) model of an integrated circuit, wherein the clock gating function includes capturing a state of an enable signal dependent upon a clock signal. The method may further include determining an amount of time to delay capturing the state of the enable signal dependent on a timing difference between a transition of the enable signal and a transition of the clock signal. The method may also include defining a clock gating circuit, wherein the clock gating circuit includes a delay unit coupled between a source of the clock signal and a capture circuit, and wherein a delay value of the delay unit is dependent upon the determined amount of time to delay capturing the enable signal by the capture circuit. The method may further include modifying the HDL model dependent upon the clock gating circuit.

In a further embodiment, the method may further include modifying the HDL model using an automated circuit design tool. In another embodiment, the amount of time may be less than or equal to a predetermined timing margin allowed for the clock signal. In one embodiment, determining the amount of time to delay the capturing of the state of the enable signal may be dependent upon a rising transition of the enable signal.

In another embodiment, the method may further include characterizing timing of a falling edge of the enable signal responsive to modifying the HDL model. In one embodiment, the method may further include increasing a number of logic gates in a control circuit responsive to modifying the HDL model, wherein the control circuit is configured to generate the enable signal. In a further embodiment, increasing the number of logic gates in the control circuit may comprise adding at least one input control signal, wherein the at least one input control signal may correspond to at least one additional condition for asserting the enable circuit.

BRIEF DESCRIPTION OF THE DRAWINGS

The following detailed description makes reference to the accompanying drawings, which are now briefly described.

Figure 1:
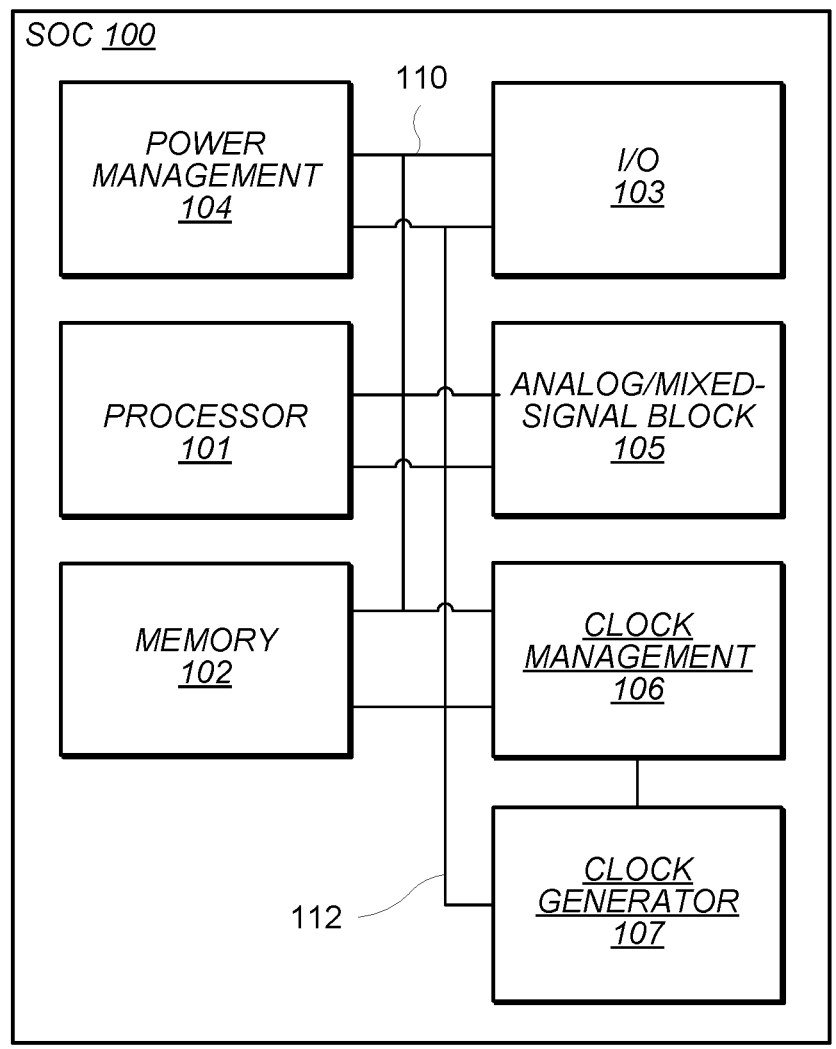
FIG. 1 illustrates an embodiment of a system-on-a-chip (SoC).

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

DETAILED DESCRIPTION OF EMBODIMENTS

An integrated circuit, such as, for example, a system on a chip (SoC), may include one or more functional blocks, such as, e.g., a processor and one or more memories, which may integrate the function of a computing system onto a single integrated circuit. In some SoC designs, multiple clock signals may be included as required to support various features of the SoC. In addition, in various embodiments, one clock signal may propagate to multiple functional blocks, creating what is referred to herein as a "clock-tree." Sometimes, a given functional block may receive an active clock signal even if the given functional block is not active. If the active clock signal is allowed to propagate through the inactive functional block, unnecessary switching noise and power consumption may occur. Some SoC designs may, therefore, implement clock gating to block propagation of an active clock signal beyond a given point in the clock-tree circuits.

Clock gating refers to a method of deactivating a clock signal for one or more portions of an SoC while allowing the clock signal to remain active for other portions of the SoC. In some embodiments, clock gating may be enabled through software by writing to a register to enable one or more clocks to a particular portion of the SoC. For example, a software program may have disabled a given functional block and therefore may disable clocks to the given functional block. In other embodiments, either in addition to or in place of software initiated clock gating, hardware circuits may be used to determine when a given portion of the circuits is active and, therefore, needs a particular clock signal. Circuits for generating clock enable signals may include logic for determining when a functional block or a portion of a functional block requires a given clock signal. The more complex or fine grained the logic for generating a clock enable signal, the more often and efficiently the clock signal may able to be gated off, thereby reducing power consumption and switching noise in the functional block.

Complex logic for generating the clock enable signal, however, may also result in an enable signal that is slower to respond to changes from input signals to the logic. If a state of the enable signal is delayed, then a clock gating circuit may receive the signal to enable or disable the corresponding clock signal too late, which could cause, in some embodiments, the functional block to function incorrectly or even causing a system failure.

A method and a system are desired to allow for increased complexity in the generation of such clock enable signals without jeopardizing reliable performance of an integrated circuit. Various embodiments of a clock gating methodology to allow for late arrival of clock enable signals are discussed in this disclosure. The embodiments illustrated in the drawings and described below may provide techniques for implementing a clock gating strategy within an integrated circuit that may reduce switching noise and power consumption from unnecessary clock propagation in an SoC.

Moving to FIG. 1, a block diagram of an embodiment of an SoC is illustrated. In the illustrated embodiment, the SoC 100 includes a processor 101 coupled to memory block 102, I/O block 103, power management unit 104, analog/mixed-signal block 105, clock management unit 106, all coupled through bus 110. SoC 100 also includes clock generator 107, coupled to the other functional blocks through clock signals 112. In various embodiments, SoC 100 may be configured for use in a mobile computing application such as, e.g., a tablet computer or smartphone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include multiple processors or CPU cores and may include one or more register files and memories.

In various embodiments, processor 101 may implement any suitable instruction set architecture (ISA), such as, e.g., PowerPC™, or x86 ISAs, or combination thereof. Processor 101 may include one or more bus transceiver units that allow processor 101 to communication to other functional blocks within SoC 100 such as, memory block 102, for example.

Memory block 102 may include any suitable type of memory such as, for example, a Dynamic Random Access Memory (DRAM), a Static Random Access Memory (SRAM), a Read-only Memory (ROM), Electrically Erasable Programmable Read-only Memory (EEPROM), a FLASH memory, a Ferroelectric Random Access Memory (FeRAM), resistive RAM (RRAM or ReRAM), or a Magnetoresistive Random Access Memory (MRAM), for example. Some embodiments may include a single memory, such as memory block 102 and other embodiments may include more than two memory blocks (not shown). In some embodiments, memory block 102 may be configured to store program instructions that may be executed by processor 101. Memory block 102 may, in other embodiments, be configured to store data to be processed, such as graphics data, for example.

I/O block 103 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 103 may be configured to implement a version of Universal Serial Bus (USB) protocol, IEEE 1394 (Firewire®) protocol, or, and may allow for program code and/or program instructions to be transferred from a peripheral storage device for execution by processor 101. In one embodiment, I/O block 103 may be configured to perform the data processing necessary to implement an Ethernet (IEEE 802.3) networking standard.

Power management unit 104 may be configured to manage power delivery to some or all of the functional blocks included in SoC 100. Power management unit 104 may comprise sub-blocks for managing multiple power supplies for various functional blocks. In various embodiments, the power supplies may be located in analog/mixed-signal block 105, in power management unit 104, in other blocks within SoC 100, or come from external to SoC 100, coupled through power supply pins. Power management unit 104 may include one or more voltage regulators to adjust outputs of the power supplies to various voltage levels as required by functional blocks within SoC 100.

Analog/mixed-signal block 105 may include a variety of circuits including, for example, a crystal oscillator, a phase-locked loop (PLL) or frequency-locked loop (FLL), an analog-to-digital converter (ADC), and a digital-to-analog converter (DAC) (all not shown). In some embodiments, analog/mixed-signal block 105 may also include, in some embodiments, radio frequency (RF) circuits that may be configured for operation with cellular telephone networks. Analog/mixed-signal block 105 may include one or more voltage regulators to supply one or more voltages to various functional blocks and circuits within those blocks.

Clock management unit 106 may be configured to enable, configure and manage outputs of one or more clock sources, such as, for example clock generator 107. In various embodiments, the clock sources may be located in analog/mixed-signal block 105, in clock management unit 106, in other blocks with SoC 100, or come from external to SoC 100, coupled through one or more I/O pins. In some embodiments, clock management unit 106 may be capable of enabling and disabling (i.e. gating) a selected clock source before it is distributed throughout SoC 100. Clock management unit 106 may include registers for selecting an output frequency of a PLL, FLL, or other type of adjustable clock source.

SoC 100 may also include clock generator 107. Clock generator 107 may be a sub-module of analog/mixed signal block 105 or clock management unit 106. In other embodiments, clock generator 107 may be a separate module within SoC 100. One or more clock sources may be included in clock generator 107. In some embodiments, clock generator 107 may include PLLs, FLLs, internal oscillators, oscillator circuits for external crystals, etc. Clock generator 107 may output one or more clock signals 112 to the functional blocks of SoC 100. One or more of functional blocks may be capable of locally gating one or more clock signal outputs 112 to enable or disable propagation of a given clock signal 112 within the one or more functional blocks.

System bus 110 may be configured as one or more buses to couple processor 101 to the other functional blocks within the SoC 100 such as, e.g., memory block 102, and I/O block 103. In some embodiments, system bus 110 may include interfaces coupled to one or more of the functional blocks that allow a particular functional block to communicate through the bus. In some embodiments, system bus 110 may allow movement of data and transactions (i.e., requests and responses) between functional blocks without intervention from processor 101. For example, data received through the I/O block 103 may be stored directly to memory block 102.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies.

Figure 2:
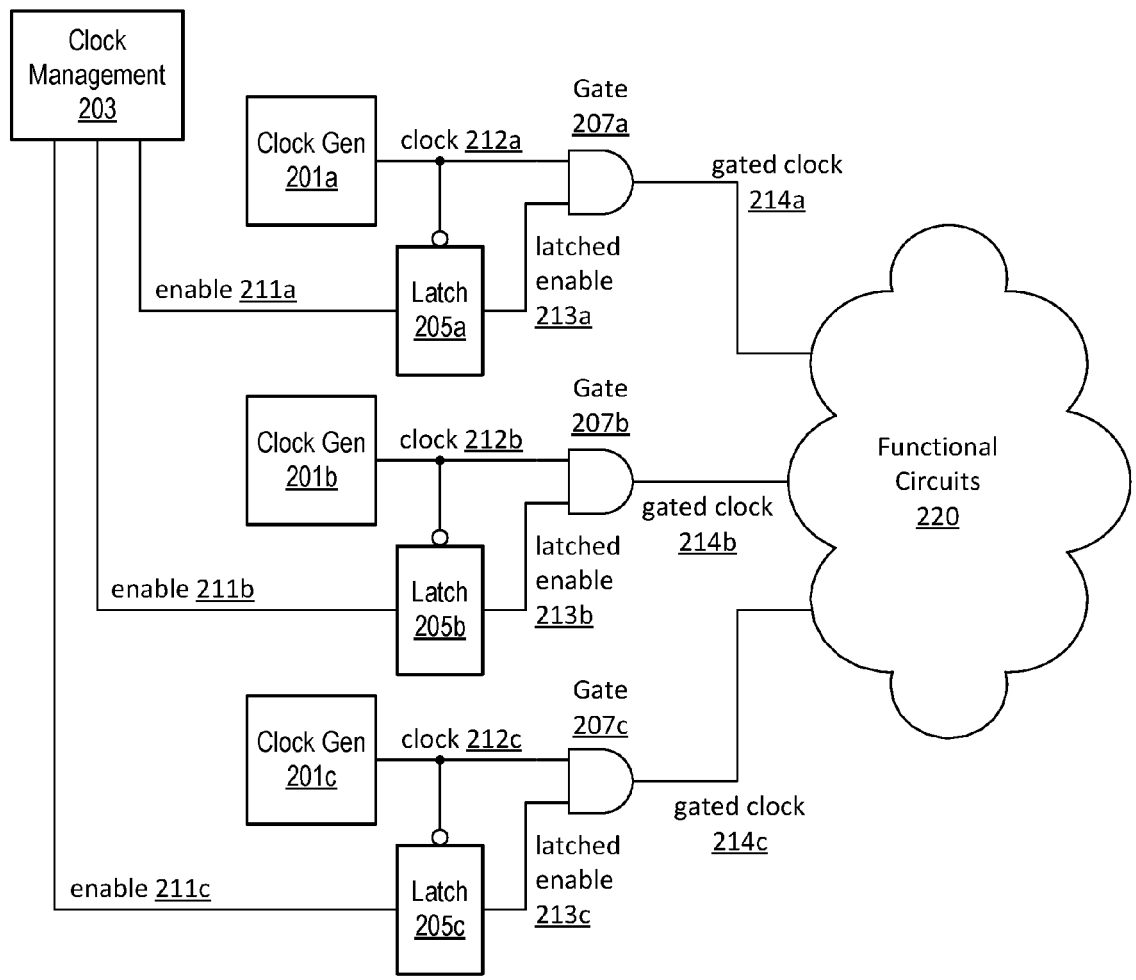
FIG. 2 illustrates a first embodiment of a block diagram of clocking scheme for functional blocks in an SoC.

Turning to FIG. 2, an embodiment of a block diagram of a clock gating system usable within an SoC, such as SOC 100, is shown. The illustrated embodiment of system 200 includes clock generators 201a-201c, each coupled to a corresponding latch 205a-205c and coupled to a corresponding gate 207a-207c. System 200 also includes clock management logic 203 coupled to latches 205 and functional circuits 220 coupled to gates 207.

Clock generators 201 may provide clock signals to various functional circuits 220. Any suitable type of clock generation circuit may be used for each clock generator 201, such as, for example, a PLL, an FLL, a crystal oscillator, an internal oscillator, etc. Each clock generator 201 may be a part of clock generator 107 or an independent clock source. Although three clock generators 201 are illustrated in FIG. 2, any suitable number of clock generators may be included in various other embodiments. An output of each clock generator 201, clock signals 212a-212c, may go to a clock input of a respective latch 205 and to an input of a respective gate 207.

Clock management logic 203 may include logic for generating one or more clock enable signals, enable signals 211a-211c. Clock management logic 203 may be a part of clock management unit 106 in FIG. 3, while in other embodiments, clock management logic may be included as part of another functional block in SoC 100, such as, for example, I/O block 103 or processor 101. Enable signals 211a-211c generated by clock management logic 203 may be used to selectively enable and disable propagation of a respective clock signal to functional circuits 220, also referred to herein as clock gating.

As used herein, "clock gating" refers to a method of enabling or disabling a clock signal beyond a given point in a circuit, referred to as a "clock gate." Clock gating may be used to stop a clock signal from propagating (or being replicated) past the output of the clock gate, while allowing the clock signal to continue transitioning on the input side of the clock gate where it may be used by other circuits in SoC 100. A clock gate may be referred to as "open" when the gate allows the clock signal to transition at the gate's output and may be referred to as "closed" when the gate's output is blocking propagation of the clock signal. Clock signals may be gated from a given circuit for various reasons, such as, for example, to reduce switching noise in the given circuit, to reduce power consumption, or because a different clock signal is selected for use by the circuit at the time.

Clock management logic 203 may generate an individual enable signal 211a-211c as an input to a respective latch 205a-205c. Latches 205 may be used to conditionally capture a state of a respective enable signal 211 from clock management logic 203. More particularly, each latch 205 is clocked depending upon a respective clock signal 212 output from a respective clock generator such that while the respective clock signal 212 is low, the latch is open, or "transparent," and the respective enable signal 211 is allowed to propagate to the output of the latch. Upon a rising transition of the clock signal 211, the state of the respective enable signal 211 may be captured and maintained (i.e., "latched") at the output of the latch until the corresponding clock signal returns to a low state.

Latches 205a-205c may generate respective latched enable signals 213a-213c, received at an input of a corresponding gate 207a-207c, shown in the illustrated embodiment as an AND gate. Another input of each corresponding gate 207 may be coupled to the clock signal 212 generated by a corresponding clock generator 201. When the output of a given latch 205 is low, i.e. the respective enable signal 211 is de-asserted, gate 207 may be closed, i.e., the output of the corresponding gate 207 is a logic low value, regardless of the value of the corresponding clock signal 212. Otherwise, when the respective enable signal 211 is asserted and output by the given latch 205, the corresponding gate 207 may be open, i.e., the output of gate 207 corresponds to the state of the clock signal 212 from the corresponding clock generator 201. It is noted that the use of latches 205 may help synchronize a change in a given enable signal 211 state to the corresponding clock signal 212 to avoid generating unwanted glitches on the output of a given gate 207. Although AND gates are shown in the illustration, any suitable gating circuit or combination of gates may be used to implement gates 207 in other embodiments.

Functional circuits 220 may receive the gated clock signals 214a-214c from gates 207a-207c. It is noted that functional circuits 220 are illustrative of any clocked circuitry, such as, for example, circuitry implemented within any functional block of SoC 100 in FIG. 1. In some embodiments, functional circuits 220 as well as the logic consisting of clock management logic 203, latches 205 and gates 207 may all be included in a given functional block, such as, for example memory 102. In other embodiments, functional circuits 220 may correspond to several functional blocks in SoC 100 and clock management logic 203, as well as latches 205 and gates 207 may be included clock management unit 106. The enable signals 211 from clock management logic 203 may be used to gate clock signals 212 from the clock generators 201 on and off to various portions of functional circuits 220. Further details regarding aspects of operation of one embodiment of clock gating system 200 are presented below in reference to FIG. 3.

It is noted that the embodiment of system 200 as illustrated in FIG. 2 is merely an example. The illustration of FIG. 2 has been simplified to highlight features relevant to this disclosure. In other embodiments, additional functional blocks may be included. Various embodiments may include any number of clock generators and corresponding latches and clock gates.

As used herein, "synchronous" or "synchronized" may refer to a timing relationship between transitions of two or more signals. A plurality of signals may be considered synchronous if transitions of the signals occur responsive to a common event, such as, for example, a falling edge of a common clock signal. Due to process variations and gate delays through digital circuits, synchronous signals may not all transition at an exact same point in time, yet may still be considered synchronous if their transitions occur within a consistent time of one another. Asynchronous signals may not share a common clock signal or other event to establish synchronicity. Asynchronous signals may, therefore, transition seemingly at random to each other. In other words, asynchronous signals may lack a common point of reference for timing of signal transitions.

Figure 3:
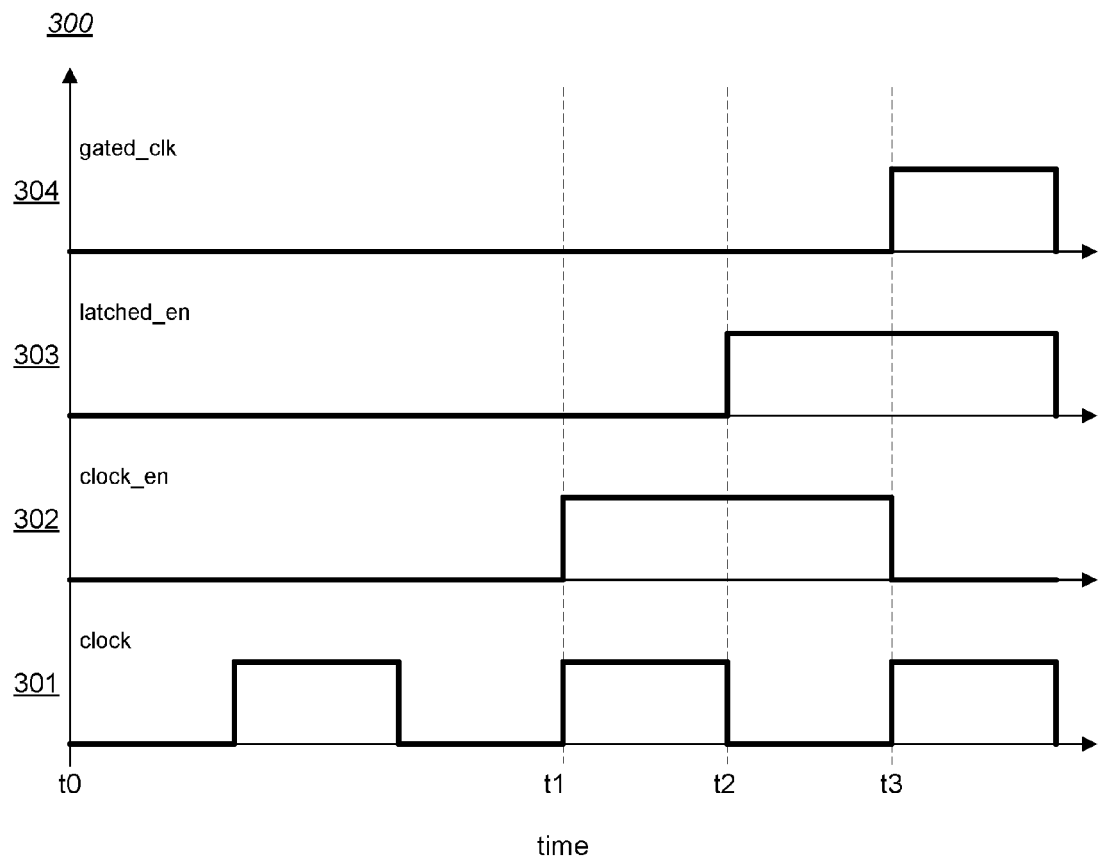
FIG. 3 illustrates a first chart of possible waveforms of the embodiment of the block diagram of FIG. 2.

Moving to FIG. 3, a timing diagram is illustrated of possible signals associated with an embodiment of clock gating system 200. Timing diagram 300 illustrates clock signal clock 301, which may correspond, for example, to clock signal 212a from clock generator 201a; clock_en 302, which may correspond to an enable signal 211 from clock management logic 203 to latch 205a; latched_en 303, which may correspond to an output of latch 205a; and gated_clk 304, which may correspond to an output of gate 207a.

Referring collectively to system 200 of FIG. 2 and timing diagram 300, the signals begin at time t0. At time t0, all four signals are low in response to gate 207a being closed. Between time t0 and time t1, clock 301 transitions high and then back low. Since latched_en 303 is low, however, gate 207a remains closed and the transitions on clock 301 are blocked from propagating to gated clock 304.

At time t1, clock 301 and clock_en 302 transition high. It is noted, however, that latch 205a may have a setup time requirement that requires the input signal, i.e., clock_en 302, to be at a particular state by a certain amount of time (i.e., the setup time) before the rising transition on the clock input to latch 205a, i.e., clock 301, in order for that particular state to be latched by latch 205a. The setup time may depend upon the design of latch 205a as well as the technology used to fabricate latch 205a. Since, in the present embodiment, clock_en 302 rises at time t1 with clock 301, it is assumed that due to the setup time of latch 205a, the low state of clock_en 302 is latched by latch 205a instead of a high state. Accordingly latched_en 303 remains at a low state and gate 207a remains closed.

At time t2, clock 301 transitions low, and latch 205a is transparent, allowing latched-en 303 to transition high to match the state of clock_en 302. With latched_en 303 in a high state, gate 207a opens. The state of clock 301, however is low, so the state of gated_clk 304 also remains low.

At time t3, clock_en 302 transitions low at the same time clock 301 transitions to a high state. Again, due to the setup and hold time of latch 205a, latched_en 303 remains in a high state rather than transitioning to a low state and, accordingly, gated_clk 304 transitions to a high state in response to the transition of clock 301 to a high state. In this example, it is noted that due to the late arriving clock_en 302 signal, gated_clk 304 transitions to a high state one cycle later than may have been intended by the circuit designers potentially resulting in a functional failure or higher power dissipation. In such an example, to avoid clock_en 302 arriving late to latch 205a, the circuits that generate clock_en 302 may be redefined, for example, by simplifying the circuits to reduce delays in the generation of clock_en 302.

Figure 4:
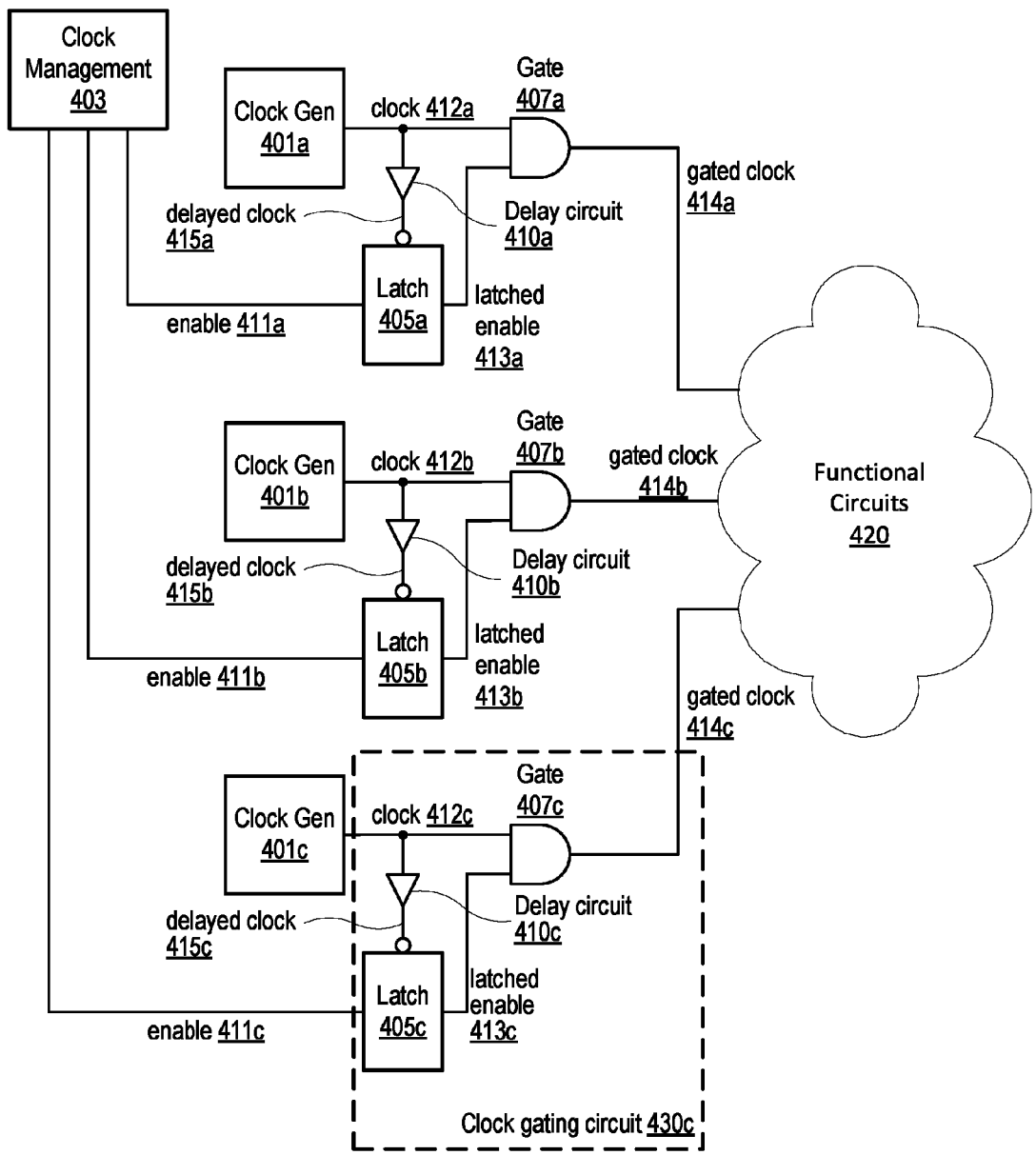
FIG. 4 illustrates a second embodiment of a block diagram of clocking scheme for functional blocks in an SoC.

Turning now to FIG. 4, a block diagram of another embodiment of a clock gating system is illustrated. The illustrated embodiment of clock gating system 400 includes clock generators 401a-401c, each coupled to a corresponding delay circuit 410a-410c and coupled to a corresponding gate 407a-407c. Clock gating system 400 also includes clock management logic 403 coupled to latches 405a-405c and functional circuits 420 coupled to gates 407. Clock gating system 400 is similar to system 200 of FIG. 2, and corresponding components of clock gating system 400 operate in accordance with the descriptions provided above in regards to clock gating system 200, except where differences are noted. The combination of a given latch 405, gate 407 and delay circuit 410 are collectively referred to herein as a clock gating circuit, such as shown for clock gating circuit 430c.

In the system of FIG. 4, delay circuits 410a-410c are coupled between respective outputs from clock generators 401a-401c and respective clock inputs to latches 405a-405c. Delay circuits may include any circuit that is configured to receive a signal at an input and generate a similar output signal after a given delay. It is noted, that although a particular delay circuit may be designed to delay an input signal for a predetermined amount of time, the predetermined amount of time may vary due to fluctuations in operating conditions and device manufacturing processes. In clock gating system 400, delay circuits 410 may delay the arrival of clock signals 412 from clock generators 401 to the clock inputs of latches 405, by generating delayed clock signals 415a-415c. By adding delays between the clock signals 412 being gated and the clock inputs to latches 405, the timing of when latches 405 capture the corresponding enable signals 411 from clock management circuit 403, relative to the clock signals 412 generated by clock generators 401 may be adjusted.

Delay circuits 410a-410c may be implemented using cascaded inverters, and a delay time for such a delay circuit may correspond to a number of inverters arranged in series.

In other embodiments, delay circuit 410c may be implemented as a current starved inverter, in which setting the selected delay time may include adjusting parameters of transistors used to control the current to the inverter.

During an integrated circuit design process, each delay circuit 410 may be adjusted individually to compensate for delays associated with each respective enable signal 411. By delaying the capture of an enable signal 411 rather than redefining the circuit that generates the enable signal 411, more complex logic may be used for determining if a corresponding clock signal 412 should be gated or not and how it can be most efficiently gated. In other words, implementation of delay circuits 410 in an SoC may allow for more intelligent and efficient clock gating in the SoC.

It is noted that FIG. 4 is merely an example for demonstration purposes. In other embodiments, circuits may be configured differently. Various other embodiments may have a different number of functional blocks.

Figure 5:
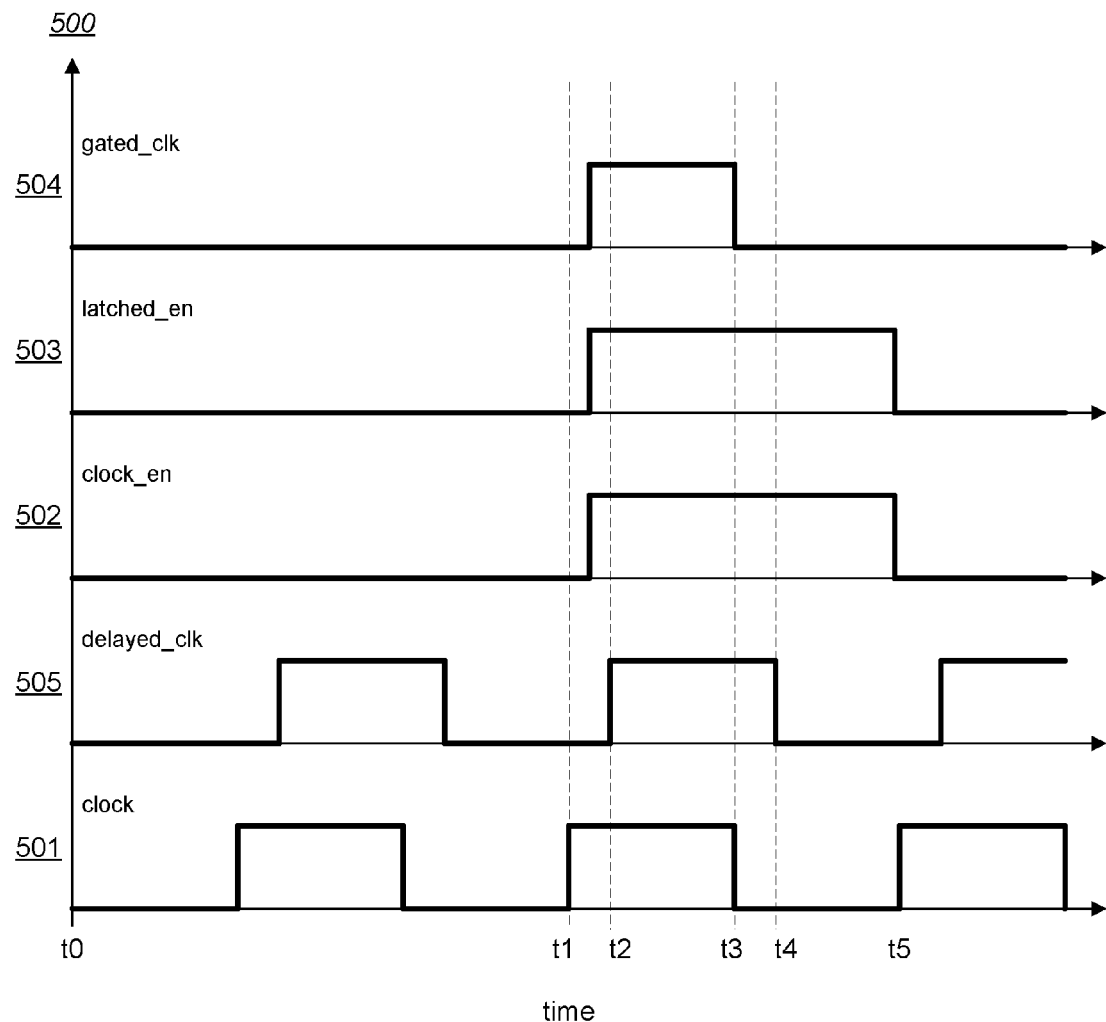
FIG. 5 illustrates a second chart including possible waveforms of the embodiment of the circuit of FIG. 4.

Moving now to FIG. 5, a timing diagram illustrates possible signals associated with an embodiment of clock gating system 400. Timing diagram 500 illustrates clock signal clock 501, which may correspond, for example, to an clock signal 412a from clock generator 401a; clock_en 502, which may correspond to enable signal 411a from clock management logic 403 to latch 405a; latched_en 503, which may correspond to latched enable signal 413a, output from latch 405a; gated_clk 504, which may correspond to gated clock 414a, output from gate 407a; and delayed_clk 505 which may correspond to delayed clock 415a output from delay circuit 410a, used to trigger latch 405a.

Referring collectively to clock gating system 400 of FIG. 4 and timing diagram 500, the signals begin at time t0. Between time t0 and time t1, clock_en 502 remains in a low state, keeping latched_en 503 in a low state and resulting in the high transition on clock 501 not propagating past gate 407a to gated_clk 504.

At time t1, clock 501 may transition high. Due to the low state of delayed_clk 505, however, latch 405a may remain transparent. Clock_en 502 transitions high between times t1 and t2. In response to the transition of clock_en 502, latched_en 503 also transitions high which in turn causes gated_clk 504 to transition high due to the high states of latched_en 503 and clock 501. Delay circuit 410a may have a predetermined delay time equal to the difference between times t2 and t1. In the illustrated embodiment, at time t2, the delay time of delay circuit 410a elapses and delayed_clk 505 transitions high, causing latch 405a to latch the high state of clock_en 502.

At time t3, gated_clk 504 transitions low in response to the low transition of clock 501. Latched_en 503, however, remains latched due to the low state of delayed_clk 505. At time t4, delayed_clk 505 transitions low, and in response, latch 405a becomes transparent. Clock_en 502 transitions low as clock 501 transitions high at time t5 and the low state of clock_en 502 is latched by the subsequent rising state of delayed clock 505.

By delaying the latching of clock_en 502 with the use of delayed_clk 505, integrated circuit designers may be able to implement more complex logic circuits for generating clock enable signals, thereby allowing clock signals to be gated under more varied conditions. More intelligent and efficient gating of clock signals may result in lower power consumption and less switching noise in an integrated circuit.

It is noted that delayed_clk 505 could allow a falling transition of clock_en 502 to propagate to gate 407a after clock 501 transitions high. This transition of clock 501 could thereby create a small high pulse on gated_clk 504, also referred to as a clock glitch, or simply glitch. Therefore, an integrated circuit design utilizing a delayed clock signal such as delayed_clk 505 may need to incorporate a logic circuit that transitions clock_en 502 to the low state before a rising edge of clock 501. Such a design may still provide the benefits described above as rising and falling edge delays for the clock_en can be independently optimized.

It is noted that FIG. 5 is merely an example of signals associated with an embodiment of the clock gating system of FIG. 4. The signals are simplified to provide clear descriptions of the disclosed concepts. The signals in various embodiments may appear different due to the various influences such as technology choices for building the circuits, actual circuit design and layout, ambient noise in the environment, choice of power supplies, etc. It is also noted that transitions through latch 405a and gate 407a are illustrated to have approximately zero delay times. In other embodiments, these circuit components may have non-zero delay times, which might result in a delay in the transitions of latched_en 503 and gated_clk 504.

Figure 6:
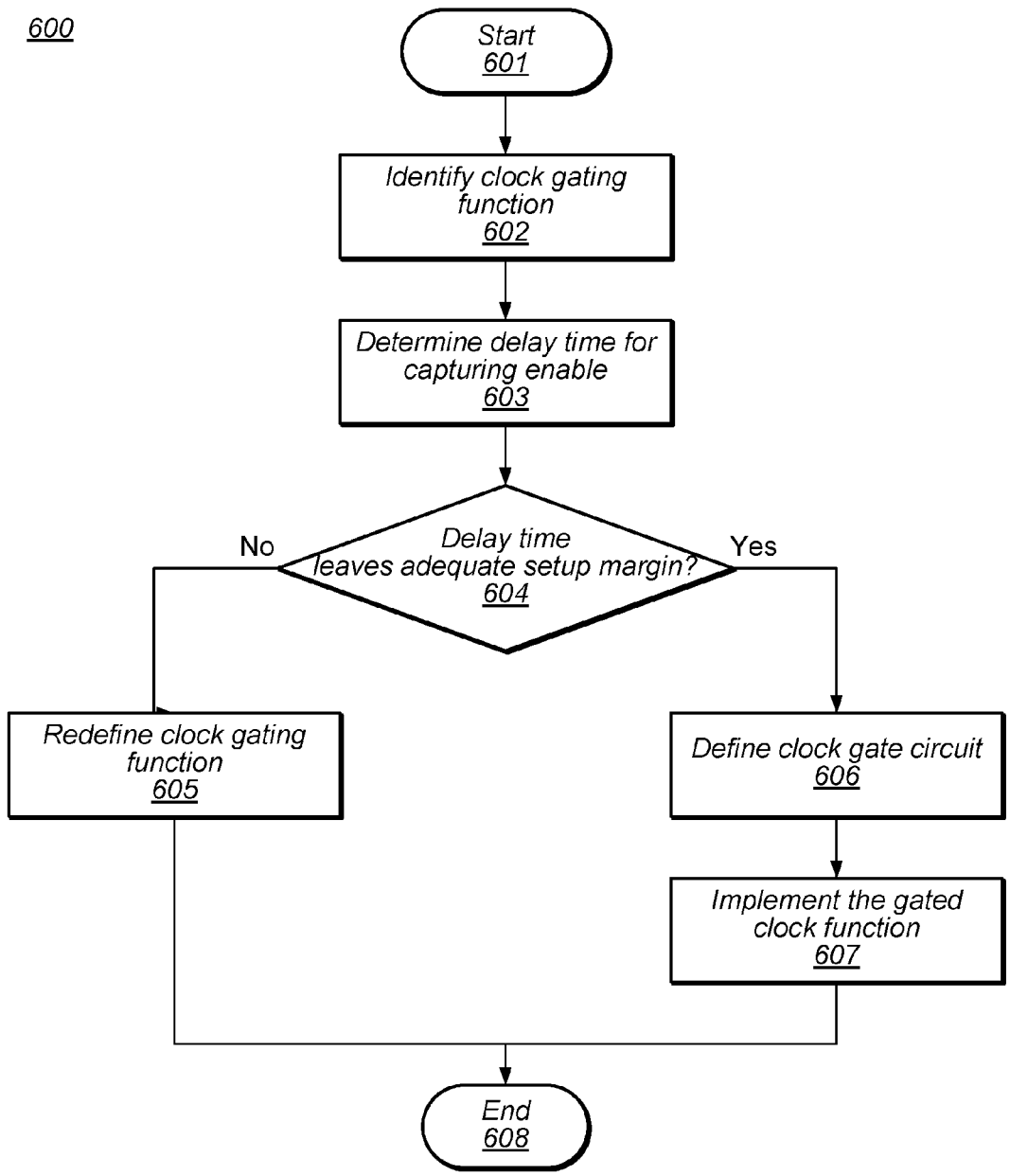
FIG. 6 illustrates a flowchart of an embodiment of a method for implementing a clock gate enable signal.

Turning to FIG. 6, a method is illustrated for implementing a clock gating circuit. Method 600 may be used for designing a clock gating circuit such as, e.g., the gated clock signals of system 400 in FIG. 4. Referring collectively to FIG. 4 and the flowchart in FIG. 6, the method may begin in block 601.

A clock gating function may be identified within an integrated circuit design (block 602). After an integrated circuit or a portion of a circuit has been designed, an analysis of the circuit may be executed on a computer system. This analysis may include a static timing analysis (STA), in which the timing of signals propagating through the circuit may be evaluated. STA may include calculating delays through various gates of the circuit using a variety of conditions as well as using various manufacturing process parameters. Operating conditions such as voltage levels, temperatures, and clock frequencies may be varied across specified ranges to estimate how the circuit performs under the variety of conditions. In addition, transistor parameters that determine circuit performance, such as, for example, channel lengths, channel widths, and threshold voltages may also be varied to simulate how the circuit will perform across a range of manufacturing tolerances. STA may indicate circuit paths which may include timing errors, also referred to as timing violations. Timing violations may include setup time violations in which an input signal transitions too late for the new state to be captured by a gate. Referring back to FIG. 3, the rising transition of clock_en 302 at time t1 may be considered to be a setup timing violation related to a clock gating function. A corresponding clock gating function, such as, for example, as implemented by clock gating circuit 430c, may be identified along with the timing violation.

A delay time may be determined for delay circuit 410c which may correct the timing violation (block 603). Delay circuit 410c may delay the clock input 412c into latch 405c, which may provide adequate setup time for the enable signal 411c from clock management circuit 403 and thereby fix the setup timing violation. Referring to FIG. 5, delay circuit 410c may delay the rising transition on clock 501 at time t1 to generate delayed_clk 505, which may allow latch 405c enough setup time to capture the state of clock_en 502 rising transition just after time t1.

The further actions of the method may depend on the value of the determined delay time (block 604). In some embodiments, the determined delay time may be compared to a predetermined threshold setup time to determine if the delay time exceeds the threshold setup time. If the determined delay time does exceed the threshold setup time, then the determined delay time may not leave a desired amount of timing margin for delayed clock 415c input to the latch and therefore be considered inadequate. As used herein, a "timing margin" or "setup margin" (also known as "slack") refers to an amount of time a circuit designer may include in an integrated circuit design to compensate for variations in timing of transitions of signals across multiple manufactured devices operating across a variety of operating conditions such as voltage supply levels, temperatures, and clock frequencies. In other embodiments, STA may be executed another time using the determined delay time to determine if the timing violation is corrected and that no new timing violations associated with the clock gate circuit are created as a result of the determined delay time. If the determined delay time is inadequate or timing violations persist, then the method may move to block 605 to redefine the logic in clock management circuits that generates enable signal 411c. Otherwise, if the determined delay time is adequate, then the method may move to block 606 to define the clock gate circuit with the determined delay time.

Logic that generates enable signal 411c that is associated with the setup timing violation may be redefined (block 605). If an adequate delay time was not determined in block 603, then the logic that generates enable signal 411c may be modified to reduce delays in the generation of enable signal 411c such that enable signal 411c transitions faster and the setup timing violation is avoided. In some embodiments, modifying the logic may include reducing a number of logic gates used to generate enable signal 411c. In some embodiments, this reduction in logic gates may require simplifying the conditions under which enable signal 411c is asserted, which may result in the corresponding clock gate being left open more often, thereby consuming more power due to the increased activity of gated clock signal 414c. The method may then end in block 608.

If the determined delay time was determined to be adequate in block 604, then a clock gate circuit may be defined using the determined delay time (block 606). In some embodiments, delay circuit 410c may need to be defined before implementing the clock gating circuit. For example, the delay may be implemented using cascaded inverters and defining delay circuit 410c may include determining a number of inverters to arrange in series. In other embodiments, delay circuit 410c may be predefined and just require adjusting of circuit parameters to set the selected delay time. For example, delay circuit 410c may be implemented as a current starved inverter and setting the determined delay time may include adjusting parameters of transistors used to control the current to the inverter.

The clock gating circuit may be implemented including the determined delay time (block 607). The clock gating circuit, including latch 405c, gate 407c, and delay circuit 410c may be implemented in the integrated circuit design. STA may be executed another time to ensure no timing violations are introduced due to the implemented clock gating circuit. In addition to, or instead of STA, a full chip simulation may be executed. Once the clock gating circuit including the determined delay time has passed any executed evaluations, the method may end in block 608.

It is noted that method 600 illustrated in FIG. 6 is merely an example embodiment. In other embodiments, method 600 may include one or more addition operations. Method 600 is described in combination with system 400 in FIG. 4. In various other embodiments however, method 600 may be applied to alternative systems with more or fewer clock gating functions. It is also noted that the method illustrated in FIG. 6 may be implemented using software, i.e., program instruction stored in a non-transitory machine-readable storage medium, which when executed on a computing system including one or more processors, performs the disclosed operations.

Figure 7:
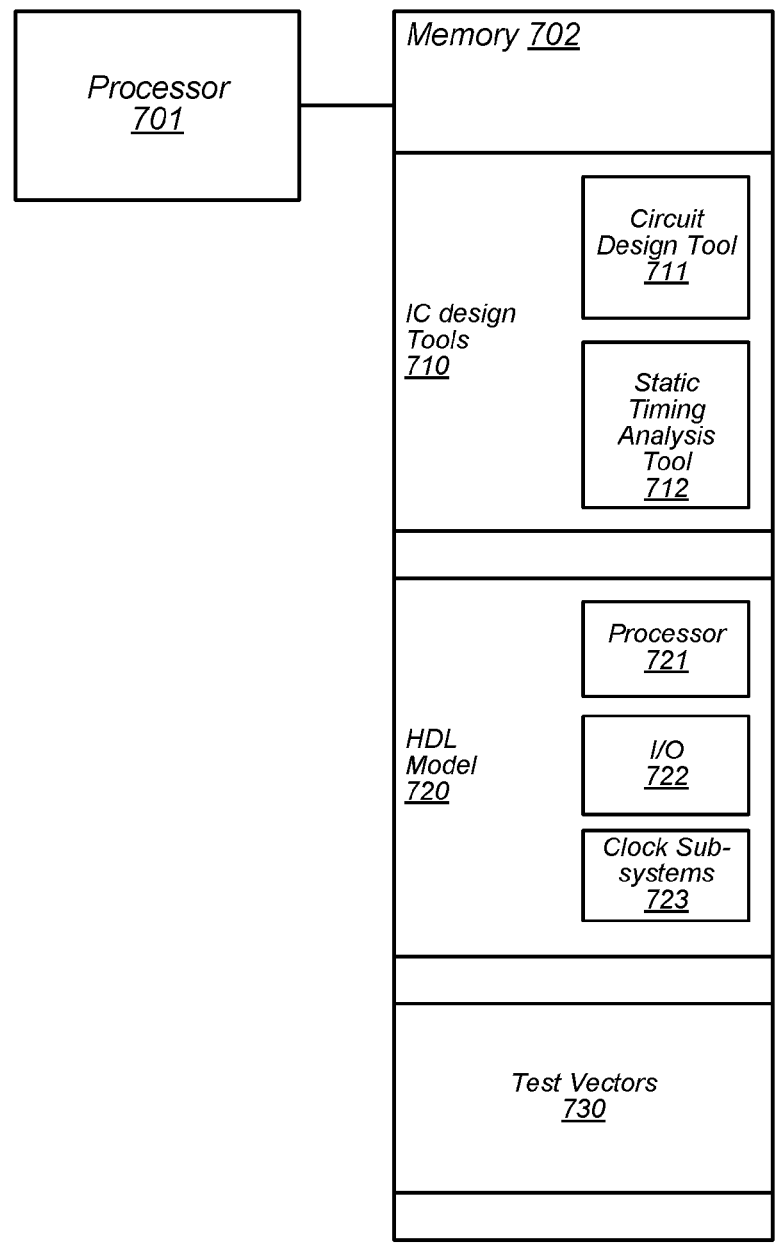
FIG. 7 illustrates a block diagram of an embodiment of a system for designing integrated circuits.

Moving now to FIG. 7, a block diagram of an embodiment of a system for designing integrated circuits is illustrated. System 700 includes a computing system that may be utilized for designing integrated circuits, such as SoC 100 in FIG. 1. More specifically, system 700 includes integrated circuit design software usable to define integrated circuitry for implementing clock gating circuits such as shown in FIG. 2 and FIG. 4. System 700 may include processor 701 coupled to memory 702. Memory 702 may store software programs, including integrated circuit (IC) design tools 710. Memory 702 may also store hardware description language (HDL) model 720 and test vectors 730.

Processor 701 may include one or more processors or cores which may read and execute instructions included in software programs stored in memory 702, such as IC design tools 710. In some embodiments, system 700 may include more than one processor 701. In a multi-processor system, the processors may be included in a single enclosure and/or in multiple enclosures coupled by a network. Processor 701 may read instructions included in the software programs of IC design tools 710 and may, responsive to executing the instructions, perform the operations of method 600 in FIG. 6.

Memory 702 may include any suitable type of memory such as, for example, Dynamic Random Access Memory (DRAM) or Static Random Access Memory (SRAM). Memory 702 may store IC design tools 710, which may be a software program suite that includes one or more software programs for designing integrated circuitry. IC design tools 710 may include programs such as circuit design tool 711 and static timing analysis tool 712. Additional programs for designing an integrated circuit may also be included in IC design tools. Each program included in IC design tools may be from a single software vendor or programs may be from a variety of vendors. IC design tools 710 may be copied into memory 702, by processor 701 for example, from a non-transitory computer-accessible storage medium, which may include a hard-disk drive, an optical disk drive, a solid-state drive, or any other suitable type of non-volatile storage.

Memory 702 may also store HDL model 720, which may further include one or more models of functional blocks, such as processor model 721, I/O model 722, and clock sub-systems model 723. Clock sub-systems may include models for one or more clock gating functions, such as described in FIG. 2 or FIG. 4. HDL model 720 may include all features of an integrated circuit, such as SoC 100, or may only include portions of the integrated circuit. Test vectors 730 may also be stored in memory 702 and may include a variety stimulus values for driving inputs and compare values for determining expected output values. Dependent upon execution of the instructions included in IC design tools 710, processor 701 may apply test vectors 730 to HDL model 720. HDL model 720 and test vectors 730 may also be stored and read from the non-transitory computer-accessible storage medium.

Numerous variations and modifications will become apparent to those skilled in the art once the above disclosure is fully appreciated. It is intended that the following claims be interpreted to embrace all such variations and modifications.

What is claimed is:

1. A system, comprising:
a clock generation unit configured to generate an output clock signal;
a clock management unit configured to generate an enable signal;
a gating circuit configured to:
generate a control signal that is a delayed version of the output clock signal;
capture and hold a state of the enable signal based on a state of the control signal; and
generate a gated clock signal based on a state of the held enable signal and the output clock signal; and
a functional circuit configured to receive the gated clock signal.

2. The system of claim 1, wherein the gating circuit is further configured to capture the state of the enable signal in response to a rising transition of the control signal.

3. The system of claim 1, wherein the control signal comprises the output clock signal delayed for a predetermined amount of time.

4. The system of claim 3, wherein the predetermined amount of time is based on a rising transition of the enable signal.

5. The system of claim 4, wherein the state of the enable signal transitions from a first state to a second state after a given transition of the output clock signal and wherein the gating circuit is further configured to capture the second state of the enable signal in response to a transition of the control signal corresponding to the given transition of the output clock signal.

6. The system of claim 1, wherein to generate the control signal, the gating circuit includes a delay circuit to delay the output clock signal, and wherein the delay circuit includes a number of inverters arranged in series.

7. The system of claim 1, wherein the clock management unit is further configured generate falling transitions of the enable signal before a next rising transition of the output clock signal.

8. A method, comprising:
performing, by a computing system, a static timing analysis of a hardware description language (HDL) model of an integrated circuit, wherein the HDL model is stored in a memory of a computer system;
identifying, by the computing system, a clock gating function included in the HDL model of the integrated circuit, wherein the clock gating function includes capturing a state of an enable signal dependent upon a clock signal;
determining, by the computing system, an amount of time to delay capturing the state of the enable signal based on a timing difference between a transition of the enable signal and a transition of the clock signal;
defining, by the computing system, a clock gating circuit such that, when fabricated, the clock gating circuit includes a delay unit coupled between a source of the clock signal and a latch circuit, and is configured to:
using the delay unit, generate a control signal that a delayed version of the clock signal;
capture and hold a state of the enable signal by using the latch circuit; and
generate a gated clock signal based on the captured state of the enable signal; and
modifying, by the computing system, the HDL model using the clock gating circuit.

9. The method of claim 8, further comprising modifying the HDL model using an automated circuit design tool.

10. The method of claim 8, wherein determining the amount of time to delay the capturing of the state of the enable signal is based on a rising transition of the enable signal.

11. The method of claim 8, further comprising characterizing timing of the HDL model in response to modifying the HDL model, wherein characterizing timing of the HDL model comprises characterizing timing of the clock gating circuit including the delay unit.

12. The method of claim 11, wherein performing the static timing analysis of the HDL model further comprises characterizing the HDL model utilizing an automated circuit design tool configured to allow capturing the state of the enable signal to be delayed an amount of time that is less than or equal to a predetermined time.

13. The method of claim 8, further comprising increasing a number of logic gates in a control circuit in response to modifying the HDL model, wherein the control circuit is configured to generate the enable signal.

14. The method of claim 13, wherein increasing the number of logic gates in the control circuit comprises adding at least one input control signal, wherein the at least one input control signal corresponds to at least one additional condition for asserting the enable signal.

15. A non-transitory computer-accessible storage medium having program instructions stored therein that, when executed by one or more processors, cause the one or more processors to perform operations comprising:
identifying a clock gating function included in a hardware description language (HDL) model of an integrated circuit, wherein the clock gating function includes capturing a state of an enable signal dependent upon a clock signal, wherein the HDL model is stored in a memory coupled to the one or more processors;
determining an amount of time to delay capturing the state of the enable signal based on timing difference between a transition of the enable signal and a transition of the clock signal;
defining a clock gating circuit such that, when fabricated, the clock gating circuit includes a delay unit coupled between a source of the clock signal and a latch circuit, and is configured to:
using the delay unit, generate a control signal that a delayed version of the clock signal;
capture and hold a state of the enable signal by using the latch circuit; and
generate a gated clock signal based on the captured state of the enable signal; and
modifying the HDL model using the clock gating circuit.

16. The non-transitory computer-accessible storage medium of claim 15, wherein the operations further comprise characterizing timing of a falling transition of the enable signal in response to modifying the HDL model.

17. The non-transitory computer-accessible storage medium of claim 15, wherein the operations further comprise determining the amount of time to delay the capturing of the state of the enable signal based on a rising transition of the enable signal.

18. The non-transitory computer-accessible storage medium of claim 15, wherein the operations further comprise characterizing timing of the HDL model in response to modifying the HDL model, wherein characterizing timing of the HDL model comprises characterizing timing of the clock gating circuit including the delay unit.

19. The non-transitory computer-accessible storage medium of claim 18, wherein to characterize the timing of the HDL model, the operations further comprise utilizing an automated timing analysis tool configured to allow capturing the state of the enable signal to be delayed an amount of time that is less than or equal to a predetermined time.

20. The non-transitory computer-accessible storage medium of claim 15, wherein the operations further comprise adding at least one new input control signal in a control circuit in response to modifying the HDL model, wherein the control circuit is configured to generate the enable signal, and wherein the at least one new input control signal corresponds to at least one condition for asserting the enable signal.

\* \* \* \* \*